United States Patent
Neveu et al.

(10) Patent No.: US 10,246,338 B2
(45) Date of Patent: Apr. 2, 2019

(54) PROCESS FOR PREPARING PRECIPITATED SILICA USING A MIXER OR EXTRUDER

(71) Applicant: RHODIA OPERATIONS, Paris (FR)

(72) Inventors: Sylvaine Neveu, Paris (FR); Anne-Laure Pinault, Antony (FR); Philippe Jost, Serpaize (FR)

(73) Assignee: Rhodia Operations, Paris (FR)

( * ) Notice: Subject to any disclaimer, the term of this patent is extended or adjusted under 35 U.S.C. 154(b) by 0 days.

(21) Appl. No.: 14/386,093

(22) PCT Filed: Mar. 21, 2013

(86) PCT No.: PCT/EP2013/055974
§ 371 (c)(1),
(2) Date: Sep. 18, 2014

(87) PCT Pub. No.: WO2013/139933
PCT Pub. Date: Sep. 26, 2013

(65) Prior Publication Data
US 2015/0110700 A1    Apr. 23, 2015

(30) Foreign Application Priority Data
Mar. 22, 2012 (FR) .................................. 12 52585

(51) Int. Cl.
*C01B 33/12* (2006.01)
*C01B 33/193* (2006.01)

(52) U.S. Cl.
CPC .......... *C01B 33/128* (2013.01); *C01B 33/193* (2013.01)

(58) Field of Classification Search
CPC ........................... C01B 33/193; C01B 33/128
USPC ................................................ 423/335, 339
See application file for complete search history.

(56) References Cited

U.S. PATENT DOCUMENTS

| | | | |
|---|---|---|---|
| 5,403,570 A * | 4/1995 | Chevallier et al. | ........... 423/339 |
| 5,882,617 A | 3/1999 | Chevallier et al. | |
| 6,013,234 A | 1/2000 | Ray et al. | |
| 6,335,396 B1 | 1/2002 | Chevallier et al. | |
| 6,423,133 B1 | 7/2002 | Touzet et al. | |
| 6,468,493 B1 * | 10/2002 | Chevallier et al. | ........... 423/339 |
| 6,761,867 B1 | 7/2004 | Prat et al. | |
| 2005/0032965 A1 | 2/2005 | Valero | |
| 2011/0178227 A1 | 7/2011 | Allain et al. | |
| 2013/0171051 A1 | 7/2013 | Clouin et al. | |

FOREIGN PATENT DOCUMENTS

| | | |
|---|---|---|
| DE | 527521 C | 6/1931 |
| DE | 2447613 A1 | 4/1976 |
| EP | 0018866 A1 | 11/1980 |
| EP | 0520862 A1 | 12/1992 |
| FR | 2722185 A1 | 1/1996 |
| GB | 1511720 A | 5/1978 |
| WO | WO 95/09127 A1 | 4/1995 |
| WO | WO 95/09128 A1 | 4/1995 |
| WO | WO 98/54090 A1 | 12/1998 |
| WO | WO 99/18045 A1 | 4/1999 |
| WO | WO 03/016215 A1 | 2/2003 |
| WO | WO 2009/112458 A1 | 9/2009 |
| WO | WO 2012/010712 A1 | 1/2012 |
| WO | WO 2013/139930 A1 | 9/2013 |
| WO | WO 2013/139932 A1 | 9/2013 |
| WO | WO 2013/139934 A1 | 9/2013 |

OTHER PUBLICATIONS

U.S. Appl. No. 14/386,012, Sylvaine Neveu, et al.
U.S. Appl. No. 14/386,015, Sylvaine Neveu, et al.
U.S. Appl. No. 14/386,069, Elise Fournier, et al.

* cited by examiner

*Primary Examiner* — James A Fiorito

(57) ABSTRACT

A process for preparing precipitated silica comprising a reaction of a silicate with an acidifying agent to obtain a suspension of precipitated silica (S1), followed by a separation step to obtain a cake, a disintegration step of said cake to obtain a suspension of precipitated silica (S2), and a drying step of this suspension, wherein the disintegration step is performed by mixing using a twin-screw mixer or by extrusion.

19 Claims, No Drawings

PROCESS FOR PREPARING PRECIPITATED SILICA USING A MIXER OR EXTRUDER

The present application is a U.S. national stage entry under 35 U.S.C. § 371 of International Application No. PCT/EP2013/055974 filed Mar. 21, 2013, which claims priority to French Application No. 12.52585 filed on Mar. 22, 2012, the whole content of this application being herein incorporated by reference for all purposes.

The present invention concerns an improved process for preparing precipitated silica.

It is known to use precipitated silicas as catalyst carrier, as absorbent for active materials (in particular carriers for liquids e.g. those used in foods such as vitamins (vitamin E in particular) and choline chloride, as thickening agent, texturing or anti-caking agent, as battery separator element, as additive for toothpaste, for paper.

It is also possible to use precipitated silicas as reinforcing filler in silicone matrixes (e.g. for coating electric cables) or in compositions containing natural or synthetic polymer(s) in particular elastomer(s) particularly diene elastomers, e.g. for shoe soles, floorings, gas barriers, flame-retardant materials and also technical parts such as rollers for cableways, seals for household electric appliances, seals for liquid or gas pipes, seals for braking systems, claddings, cables and drive belts.

Precipitated silica has long been used as reinforcing white filler in elastomers and in particular in tyres.

Precipitated silica is generally prepared by precipitation reaction between a silicate, in particular an alkali metal silicate, and an acidifying agent followed by a separation step by filtration to obtain filter cake and usually a washing step of said cake, and optionally a disintegration step of the filter cake and a drying step of said cake e.g. by atomization.

In prior art processes energy consumption is high. Drying is the main source of energy consumption and therefore represents a fairly high cost.

There is therefore a need for reduced energy consumption and for example during the drying operation.

One of the objectives of the present invention is therefore to provide a process for preparing precipitated silica with which it is possible to limit energy costs in particular in terms of drying.

It is one of the objectives of the present invention to provide a process for preparing precipitated silica allowing drying times to be limited.

In particular, it is one of the objectives of the invention to provide an alternative to known processes for preparing precipitated silica, which is economical and simple to carry out.

One of the objectives of the present invention is therefore to provide a process which permits a reduction in energy consumption for drying, in particular in comparison with prior art processes, and in general by at least about 15%, in particular by at least about 20%, for example by at least about 25% in the most preferred variant of the invention.

One of the objectives of the present invention preferably entails the providing of a process which permits an increase in productivity of the process for preparing precipitated silica, in particular at the disintegration step and/or drying step compared with prior art processes in particular and in general by at least 20%, in particular by at least 25%, for example by at least 30% in the most preferred variant of the invention.

The present invention therefore concerns a process for preparing precipitated silica comprising the reaction of a silicate with an acidifying agent to obtain a suspension of precipitated silica (S1), followed by a separation step to obtain a cake, a disintegration step of said cake to obtain a suspension of precipitated silica (S2) and a drying step of this suspension, and in which the disintegration step is performed by mixing using a twin-screw mixer or by extrusion.

In particular, the process of the present invention therefore comprises the following steps:
  reacting (precipitation reaction) at least one silicate with at least one acidifying agent in order to obtain a suspension of precipitated silica (S1);
  performing a solid-liquid separation step, more particularly a filtration step to obtain a solid product also known as a «filter cake»;
  subjecting the said filter cake to a disintegration operation by mixing using a twin-screw mixer or by extrusion, to obtain a suspension of precipitated silica (S2); and
  drying the product thus obtained, preferably by atomization.

The specific step of the process of the invention, taken in combination with the other steps of the said process, consists of a disintegration step by mixing in a twin-screw mixer or by extrusion. This step entails the use of a piston method. The use of a twin-screw mixer or of extrusion techniques for the disintegration step more particularly allows the treatment by disintegration of filter cakes having a very high content of dry matter. It is known to persons skilled in the art that conventional disintegration techniques (by chemical treatment in a tank under continuous agitation) cannot be applied to said cakes without the risk of degrading the properties of the end product e.g., dispersibility. It is recalled here that conventionally the disintegration operation is a fluidifying or liquefying operation of the cake derived from filtration, whereby the cake is made liquid the precipitated silica being suspended. In general, this operation allows lowering of the viscosity of the suspension that is to be subsequently dried. This operation can therefore conventionally be performed by subjecting the cake to chemical action, for example by adding an aluminum compound such as sodium aluminate and/or acid compound, preferably coupled with mechanical action (e.g. continuous passing through a tank under agitation).

The disintegration step of the process of the invention therefore consists of a particular mechanical action, namely mechanical action of piston type, preferably coupled with chemical treatment such as one of the chemical treatments conventionally used for the disintegration step of silica filter cakes in processes for preparing precipitated silicas.

The particular mechanical action of the disintegration step of the invention is mixing by means of a twin screw mixer or extrusion.

The implementation of the process of the invention allows energy consumption to be reduced and productivity to be increase, in particular at the drying step and/or disintegration step, compared with prior art processes, advantageously whilst not degrading the properties of the precipitated silica obtained, in particular its dispersibility, and in particular in elastomers.

When the disintegration step is performed by extrusion, use is particularly made of a single-screw extruder or preferably a twin screw extruder.

The use of a twin-screw mixer or of an extruder, in particular a twin-screw extruder, allows good distribution of the energy to be provided. The disintegration obtained is more homogeneous than conventional disintegration. Each portion of cake entering the mixer or extruder receives substantially the same energy.

In the process of the invention, the chemical reagent(s) used for chemical treatment, generally coupled with the particular mechanical action of the disintegration step, in particular an aluminum compound such as sodium aluminate and/or an acid, are added in-line.

Advantageously, the use of a twin-screw mixer or of an extruder, in particular a twin-screw extruder, allows a guaranteed identical dwell time for all the cakes subjected to the disintegration step, contrary to conventional disintegration techniques.

Preferably, the use of twin-screw mixer or of an extruder, notably a twin-screw extruder, can also allow a reduction in the dwell time of the cake in the device used for disintegration (here the said mixer or said extruder) compared with the dwell times of cakes in conventionally used devices for disintegration (which are generally at least about 20 minutes for a disintegration step in a tank under continuous agitation for example).

In general, in the process of the present invention, the dwell time of the cake in the twin-screw mixer or extruder is less than 10 minutes, advantageously between 20 seconds and 5 minutes.

This dwell time may be 1 minute. It may even be no more than 1 minute, in particular between 20 and 60 seconds, e.g. between 20 and 45 seconds.

When the disintegration step of the process of the invention is performed with a twin-screw mixer or twin-screw extruder, the corresponding twin-screw mixer or twin-screw extruder may comprise different feed zones and several shear zones. For example, the corresponding twin-screw mixer or twin-screw extruder used may comprise a first zone corresponding to the cake feed zone, a second zone corresponding to the inlet zone for one or more chemical disintegration agents (aluminate in particular), optionally a third zone corresponding to the inlet zone for a chemical disintegration agent. This twin-screw mixer or twin-screw extruder may also comprise two separate shear zones downstream of the above-mentioned feed and inlet zones.

According to one embodiment of the process of the invention, the disintegration step is conducted at a temperature of between 15 and 120° C. It can be conducted at a temperature of between 15 and 80° C., preferably between 40 and 70° C. It can also be implemented at a temperature of between 50 and 120° C., in particular between 60 and 100° C., in particular by adding steam.

In general, in the process of the invention, the product (cake) subjected to the disintegration step by mixing in a twin-screw mixer or by extrusion, in particular by twin-screw extrusion, may have a dry matter percentage (or dryness or dry extract content) of at least 15% by weight, in particular of at least 18% by weight, more particularly between 18 and 40% and for example of between 20 and 35% by weight.

One of the advantages of the process of the invention is that it allows the treatment by disintegration of products (cakes) having a very high dry matter content, in particular of at least 25% by weight, more particularly between 25 and 40%, for example between 25 and 35% by weight, notably without degradation of the properties of the final precipitated silica e.g. dispersibility in elastomers.

Therefore in one most preferred variant of the process of the invention, it comprises a compacting step at rather high pressure between the separation step and the disintegration step such as set forth above, in general allowing a product (cake) to be obtained having a very high content of dry matter such as indicated above.

This compacting step allows a large amount of water to be removed from the cake obtained after the precipitation and separation steps.

With said operation it is therefore possible to increase the dry matter content of the product before the disintegration and drying steps. The product subsequently subjected to drying contains less water, which therefore leads to energy savings for the subsequent drying step.

The more the filter cake is compacted, the more water is removed and hence the greater the increase in the dry matter content of the cake.

It can therefore be carried out using techniques known to those skilled in the art. It is advantageously performed on a filter equipped with compacting means, the compacting pressure being relatively high. It can be performed on completion of filtration, after or towards the end of an optional washing step, for example on a filter press by swelling of the membranes of the membrane plates.

In this most preferred variant of the process of the invention, the compacting step is performed at a pressure of more than 10 bars, preferably at a pressure of at least 20 bars.

According to one embodiment of this variant, the compacting step is performed at a pressure of more than 10 bars and less than 60 bars, preferably at between 15 and 45 bars, in particular between 20 and 45 bars, more preferably between 20 and 35 bars. This step can be conducted at a compacting pressure of between 20 and 30 bars. For example, the pressure may be about 25 bars.

It is generally preferable to conduct this compacting step at a pressure of no more than 45 bars, in particular no more than 35 bars. If the pressures are too high, the filter cake may be degraded and will therefore not lead to particles of precipitated silica of satisfactory quality.

The compacting step may optionally be performed on the same filter as the one used for the filtration step. The filtration step, the optional washing step and the compacting step may in some cases consist of a single separation step comprising filtration, optional washing (e.g. with water) and final strong compacting on a filter equipped with compacting means such as a filter press.

In general the duration of the compacting step, at the indicated pressure, in this most preferred variant of the process of the invention, is at least 200 seconds, preferably between 300 and 600 seconds.

Advantageously the product obtained after the compacting step has a dry matter content of at least 28% by weight, in particular between 28 and 35% by weight, for example between 28 and 32% by weight. This dry matter content may be at least 29%, in particular at least 30% by weight and in particular between 29 and 35% by weight, for example between 29 and 32% by weight.

The process of the invention concerns a process for synthesizing precipitated silica i.e. first a precipitation step is conducted in which at least one acidifying agent is caused to react with at least one silicate, without any limitation to any particular type of precipitated silica.

The process of the invention can be implemented in particular to prepare precipitated silicas such as obtained following the processes described for example in EP 0 520 862, EP 0 670 813, EP 0 670 814, EP 0 917 519, WO 95/09127, WO 95/09128, WO 98/54090, WO 03/016215, WO 2009/112458 or WO 2012/010712.

The precipitation reaction by reaction of a silicate with an acidifying agent can be conducted in the process of the invention using any preparation mode, in particular by adding an acidifying agent to a silicate feedstock, or else by the full or partial simultaneous adding of acidifying agent and silicate or of silicate and acidifying agent to a water feedstock.

The choice of acidifying agent and silicate is made in manner known per se. As acidifying agent, use is generally made of a strong mineral acid such as sulphuric acid, nitric acid or hydrochloric acid, or an organic acid such as acetic acid, formic acid, carbonic acid.

After the precipitation step, a suspension (slurry) S1 of precipitated silica is obtained, to which various additives may optionally be added, which is then separated.

According to one particular embodiment of the invention, the above-mentioned separation step consists of a solid-liquid separation step. Preferably, it consists of a filtration step after which a filter cake is obtained, optionally followed by a washing step of said cake.

Filtration can be performed using any suitable method, for example using a filter press or belt filter or a vacuum rotary filter.

The product (cake) obtained is then subjected to the disintegration step such as described above.

In the most preferred variant of the process of the invention, it comprises a compacting step at rather high pressure, such as set forth above, between the separation step and this disintegration step.

According to one embodiment, the process of the invention may comprise a de-agglomerating step between the separation step and disintegration step; in the much preferred variant of the process of the invention, this optional de-agglomerating step is performed between the compacting step and the disintegration step.

This optional step consists of crumbling the cake derived from the separation step, or in the most preferred variant of the process of the invention the product (cake) derived from the compacting step, and allows the particle size of the said cake to be reduced. For example, this step can be conducted using a Gericke Nibbler in which the cake is forced through a screen of diameter less than 20 mm, preferably of size between 2 and 14 mm. This de-agglomerating step can also be carried out using de Wyssmont tools such as the "Rotocage Lumpbreaker", the "Double Rotocage Lumpbreaker" or "Triskelion Lumpbreaker".

The suspension of precipitated silica S2 obtained after the disintegration step is then dried.

This drying can be conducted using any method known per se.

According to one preferred embodiment of the process of the invention, drying is performed by atomization.

For this purpose any type of suitable atomizer can be used, in particular a turbine atomizer, preferably a nozzle atomizer, a liquid pressure atomizer or a two-fluid atomizer.

When drying is conducted using a nozzle atomizer, the precipitated silica able to be obtained with the process of the invention is then advantageously in the form of substantially spherical beads (micropearls) preferably having a mean size of at least 80 μm.

After this drying, the collected product can optionally be ground; the precipitated silica obtained is then generally in the form of a powder, preferably of mean size between 5 and 70 μm.

If drying is performed using a turbine atomizer, the precipitated silica able to be obtained may then be in the form of a powder, for example of mean size between 5 and 70 μm.

Also, the dried product in particular when in powder form or ground can optionally be subjected to an agglomerating step consisting for example of direct compression, wet granulation (i.e., using a binder such as water, silica suspension . . . ), extrusion or preferably dry compacting. If this latter technique is used, it may be expedient, before starting to compact, to deaerate the powder products (operation also called pre-densification or degassing) to remove the air included therein and to ensure more uniform compacting.

The precipitated silica able to be obtained after this agglomeration step is generally in the form of granules, in particular at least 1 mm in size, in particular between 1 and 10 mm particularly along the axis of their largest dimension.

The following Examples illustrate the invention without, however, limiting the scope thereof.

EXAMPLES

Example 1 (According to the Invention)

The suspension of precipitated silica used (S1) was a slurry of Z1165MP silica derived from a precipitation reaction having the following characteristics:
Temperature: 60° C.
pH: 4.4-5.2
Humidity: 90%

Part of the suspension of silica S1 was filtered and washed on a filter press and then compacted at a pressure of 8 bars. The resulting silica cake G1 had a dry extract of 23.5%.

The other part of the silica suspension S1 was filtered and washed on a filter press and subjected to compacting at a pressure of 25 bars. The resulting silica cake G2 had a dry extract of 29%.

The cake G1 was de-agglomerated by passing through a Nibbler (Gericke) equipped with an 8-mm screen.

The broken-up silica cake was then added via a metering screw feeder at 5 kg/h to a Clextral BC21 twin-screw extruder rotating at 250 rpm. Sodium aluminate was added via a branch line into the extruder after the feed zone (10 cm distant from the intake) so that the flow rate of sodium aluminate was 0.33 ml/min.

The product leaving the extruder was collected in a tank in which the pH was adjusted to 6 with addition of sulphuric acid.

The slurry obtained was then dried by atomization to provide a precipitated silica in powder form P1.

The cake G2 was de-agglomerated by passing through a Nibbler (Gericke) equipped with an 8-mm screen.

The broken-up silica cake was then added via a metering screw feeder at 5 kg/h to a Clextral BC21 twin-screw extruder rotating at 250 rpm. Sodium aluminate was added via a branch line into the extruder after the feed zone (10 cm distant from the intake) so that the flow rate of sodium aluminate was 0.4 ml/min.

The product leaving the extruder was collected in a tank in which the pH was adjusted to 6 through the addition of sulphuric acid.

The slurry obtained was then dried by atomization to provide a precipitated silica in powder form P2.

It was found, for the slurry obtained from cake G2, that the energy savings were 25% and the associated productivity gain was 33% compared with the drying of the slurry derived from cake G1.

With the process of the invention, it is therefore also possible to obtain very satisfactory results for cakes having a high dry extract.

Example 2 (According to the Invention)

The suspension of precipitated silica used (S1) was a slurry of Z1165MP silica derived from a precipitation reaction, having the following characteristics:

Temperature: 60° C.
pH: 4.4-5.2
Humidity: 90%

Part of the silica suspension S1 was filtered and washed on a filter press and then compacted at a pressure of 8 bars. The resulting silica cake G1 had a dry extract of 23.5%.

The other part of the silica suspension S1 was filtered and washed on a filter press and then compacted at a pressure of 25 bars. The resulting silica cake G2 had a dry extract of 29%.

Part of the silica cake G1 was broken-up by passing through a Nibbler (Gericke) equipped with an 8-mm screen.

The broken-up silica cake was added via a metering screw feeder at 76 kg/h (corresponding to a specific flow rate of the cake i.e. a rate calculated as per the effective volume of the mixer of 97.4 kg/h/L) to a twin-screw UCP 2"*17" mixer (RPA process) rotating at 105 pm. Sodium aluminate was added via a branch line of the mixer after the feed zone so that the flow rate of sodium aluminate was 4.65 ml/min.

The mixed product was collected in a tank in which the pH was adjusted to 6.2 through the addition of sulphuric acid.

The slurry obtained was dried by atomization to obtain a precipitated silica in the form of micro-pearls MP1.

The silica cake G2 de-agglomerated up by passing through a Nibbler (Gericke) equipped with a 8 mm screen.

The broken-up silica cake was then added via a metering screw feeder at 127 kg/h to a twin-screw UCP 2"*17" mixer (RPA process) rotating at 155 rpm. Sodium aluminate was added via branch line of the mixer after the feed zone so that the flow rate of sodium aluminate was 9.80 ml/min.

The mixed product was collected in a tank in which the pH was adjusted to 6.2 through the addition of sulphuric acid.

The slurry obtained was dried by atomization to obtain a precipitated silica in the form of micro-pearls MP2.

It was found that for the slurry obtained from cake G2 the energy savings were 25% and the associated productivity gain was 33% compared with the drying of the slurry derived from cake G1.

With the process of the invention it is therefore possible also to obtain very satisfactory result for cakes with a high dry extract.

Example 3

Part of the silica cake G1 obtained in Example 2 was placed in a vessel under continuous agitation for one hour at a specific cake feed rate i.e. a rate calculated as per the effective volume of said vessel of 1.78 kg/h/L, i.e. a much lower rate than in Example 2 for cake G1, the sodium aluminate also being added at a rate of 14.75 g/min to said vessel under agitation.

The product obtained was collected in a tank in which the pH was adjusted to 6.7 through the addition of sulphuric acid.

The slurry obtained was dried by atomization to obtain a precipitated silica in the form of micro-pearls MP3.

It was found that the silica MP1 obtained in Example 2 displayed characteristics close to those of silica MP3, in particular similar dispersibility.

The invention claimed is:

1. A process for preparing a precipitated silica, the process comprising:
   reacting a silicate with an acidifying agent to obtain a suspension of precipitated silica (S1), followed by separation to obtain a cake having a dry matter content of at least 25% by weight,
   compacting the cake at a pressure higher than 10 bars and lower than 60 bars;
   disintegrating the cake to obtain a suspension of precipitated silica (S2) by mixing in a twin-screw mixer or by extrusion, and
   drying the suspension of precipitated silica (S2).

2. The process according to claim 1, wherein the disintegrating is performed in a twin-screw mixer.

3. The process according to claim 1, wherein the disintegrating is performed in an extruder.

4. The process according to claim 3, wherein the disintegrating is performed in a twin-screw extruder.

5. The process according to claim 1, wherein the cake has a dwell time in the mixer or extruder of less than 10 minutes.

6. The process according to claim 1, wherein the disintegrating is conducted in the presence of an aluminum compound.

7. The process according to claim 1, wherein the cake has a dry matter content of between 25% and 40% by weight.

8. The process according to claim 1, wherein the cake is compacted at a pressure of at least 20 bars.

9. The process according to claim 1, further comprising de-agglomerating the cake prior to disintegrating the cake.

10. The process according to claim 1, wherein the separation consists of filtration, optionally followed by washing.

11. The process according to claim 10, wherein the filtration is performed using a vacuum filter or filter press.

12. The process according to claim 1, wherein the drying is performed by atomization.

13. The process according to claim 1, wherein the product derived from drying is subjected to grinding.

14. The process according to claim 1, wherein the product derived from drying is subjected to agglomerating.

15. The process according to claim 13, wherein the product derived from grinding is subjected to agglomerating.

16. The process according to claim 1, wherein the cake has a dwell time in the mixer or extruder between 20 seconds and 5 minutes.

17. The process according to claim 1, wherein the cake has a dry matter content between 25% and 35% by weight.

18. The process according to claim 1, further comprising de-agglomerating the cake after compacting the cake and prior to disintegrating the cake.

19. The process according to claim 1, wherein the step of compacting the cake is performed on a filter equipped with compacting means.

* * * * *